US011397085B1

(12) United States Patent
Anderson

(10) Patent No.: US 11,397,085 B1
(45) Date of Patent: Jul. 26, 2022

(54) SHAKEN-LATTICE MATTER-WAVE GYRO

(71) Applicant: ColdQuanta, Inc., Boulder, CO (US)

(72) Inventor: Dana Zachary Anderson, Boulder, CO (US)

(73) Assignee: ColdQuanta, Inc., Boulder, CO (US)

( * ) Notice: Subject to any disclaimer, the term of this patent is extended or adjusted under 35 U.S.C. 154(b) by 479 days.

(21) Appl. No.: 16/287,608

(22) Filed: Feb. 27, 2019

Related U.S. Application Data

(60) Provisional application No. 62/742,395, filed on Oct. 7, 2018.

(51) Int. Cl.
G01C 19/00 (2013.01)
H05H 3/02 (2006.01)
G01C 19/66 (2006.01)

(52) U.S. Cl.
CPC ........... G01C 19/661 (2013.01); G01C 19/00 (2013.01); H05H 3/02 (2013.01)

(58) Field of Classification Search
None
See application file for complete search history.

(56) References Cited

U.S. PATENT DOCUMENTS

| 7,030,370 | B1 | 4/2006 | Crookston et al. | |
| 2009/0046298 | A1* | 2/2009 | Betzig | G02B 27/58 |
| | | | | 356/521 |
| 2018/0066942 | A1* | 3/2018 | Compton | G01C 19/64 |
| 2018/0211739 | A1* | 7/2018 | Ovchinnikov | G21K 1/06 |
| 2018/0352642 | A1* | 12/2018 | Dupont-Nivet | G01C 19/64 |

FOREIGN PATENT DOCUMENTS

CN 102927978 A * 2/2013

OTHER PUBLICATIONS

"Scalability, Complexity and Reliability in Quantum Information Procesing" AFRL-IF-RS-TR-2007-95 Final Technical Report (Mar. 2007) (Year: 2007).*
Diao et al. "Alternative laser system for cesium magnetooptical trap via optical injection locking to sideband of a 9-GHz current-modulated diode laser" Optics Express, vol. 20, No. 7, 7480 (Mar. 26, 2012) (Year: 2012).*

(Continued)

*Primary Examiner* — James Choi
(74) *Attorney, Agent, or Firm* — Clifton Leon Anderson

(57) ABSTRACT

A matter-wave gyro with counter-propagating traps uses three-dimensional lattices formed of interference fringes from three pairs of interfering laser beams. Particles, such as neutral atoms, ion, or molecules are cooled to a ground state near absolute zero. The resulting ultra-cold particles are loaded into the lattices. The laser beams used to form the lattices are driven according to functions that cause the lattices to counter-propagate about a closed path (Sagnac loop) N times, where a desired tradeoff between spatial resolution and temporal resolution can be achieved by choosing an appropriate integer value of N. The lattices can be extinguished so that the particles can be imaged to identify an interference pattern. A shift in the interference pattern relative to an interference pattern that would occur with zero angular momentum can be used to measure angular momentum.

20 Claims, 4 Drawing Sheets

(56) References Cited

OTHER PUBLICATIONS

C. A. Weidner, H. Yu, R. Kosloff, and D. Z. Anderson, "Atom interferometry using a shaken optical lattice," Phys Rev A, vol. 95, No. 4, p. 043624, Apr. 2017.
C. A. Weidner and D. Z. Anderson, "Experimental Demonstration of Shaken-Lattice Interferometry," Phys. Rev. Lett., vol. 120, No. 26, 2018.
C. J. E. Straatsma, M. K. Ivory, J. Duggan, J. Ramirez-Serrano, D. Z. Anderson, and E. A. Salim, "On-chip optical lattice for cold atom experiments," Opt Lett, vol. 40, No. 14, pp. 3368-3371, 2015.
D. M. Farkas, K. M. Hudek, E. A. Salim, S. R. Segal, M. B. Squires, and D. Z. Anderson, "A compact, transportable, microchip-based system for high repetition rate production of Bose-Einstein condensates," Appl Phys Lett, vol. 96, No. 9, p. 093102, 2010.
A. D. Ludlow and J. Ye, "Progress on the optical lattice clock," Comptes Rendus Physique, vol. 16, No. 5, pp. 499-505, Jun. 2015.
S. Pötting, M. Cramer, and P. Meystre, "Momentum-state engineering and control in Bose-Einstein condensates," Phys. Rev. A, vol. 64, No. 6, p. 063613, Nov. 2001.
C. A. Weidner and D. Z. Anderson, "Simplified landscapes for optimization of shaken lattice interferometry," New J. Phys., vol. 20, No. 7, 2018.
B. A. Dinardo and D. Z. Anderson, "A technique for individual atom delivery into a crossed vortex bottle beam trap using a dynamic 1D optical lattice," Review of Scientific Instruments, vol. 87, No. 12, p. 123108, Dec. 2016.
V. Dunjko and H. J. Briegel, "Machine learning & artificial intelligence in the quantum domain: a review of recent progress," Rep Prog Phys, vol. 81, No. 7, Jul. 2018.
S. Pötting, M. Cramer, C. H. Schwalb, H. Pu, and P. Meystre, "Coherent acceleration of Bose-Einstein condensates," Phys. Rev. A, vol. 64, No. 2, Aug. 2001.
P. Doria, T. Calarco, and S. Montangero, "Optimal Control Technique for Many-Body Quantum Dynamics," Phys. Rev. Lett., vol. 106, No. 19, 2011.
T. Caneva, T. Calarco, and S. Montangero, "Chopped random-basis quantum optimization," Phys. Rev. A, vol. 84, No. 2, 2011.
N. Rach, M. M. Mueller, T. Calarco, and S. Montangero, "Dressing the choppedrandom-basis optimization: A bandwidth-limited access to the trap-free landscape," Phys. Rev. A, vol. 92, No. 6, 2015.
S. Machnes, E. Assémat, D. Tannor, and F. K. Wilhelm, "Tunable, Flexible, and Efficient Optimization of Control Pulses for Practical Qubits," Phys. Rev. Lett., vol. 120, No. 15, p. 8, Apr. 2018.
V. Mnih, K. Kavukcuoglu, D. Silver, A. Graves, I. Antonoglou, D. Wierstra, and M. Riedmiller, "Playing Atari with Deep Reinforcement Learning," arXiv.org, vol. cs.LG. Dec. 19, 2013.
V. Mnih, K. Kavukcuoglu, D. Silver, A. A. Rusu, J. Veness, M. G. Bellemare, A. Graves, M. Riedmiller, A. K. Fidjeland, G. Ostrovski, S. Petersen, C. Beattie, A. Sadik, I. Antonoglou, H. King, D. Kumaran, D. Wierstra, S. Legg, and D. Hassabis, "Human-level control through deep reinforcement learning," Nature, vol. 518, No. 7540, pp. 529-533, 2015.
P. Bouyer, "The centenary of Sagnac effect and its applications: From electromagnetic to matter waves," P. B. G. A. Navigation2014.
K. Henderson, C. Ryu, C. MacCormick, and M. G. Boshier, "Experimental demonstration of painting arbitrary and dynamic potentials for Bose-Einstein condensates," New J Phys, vol. 11, No. 4, p. 043030, Apr. 2009.
S. Gupta, K. W. Murch, K. L. Moore, T. P. Purdy, and D. M. Stamper-Kurn, "Bose-Einstein condensation in a circular waveguide," Phys. Rev. Lett., vol. 95, No. 14, 2005.
S. Wu, E. Su, and M. Prentiss, "Demonstration of an Area-Enclosing Guided-Atom Interferometer for Rotation Sensing," Phys Rev Lett, vol. 99, No. 17, p. 173201, Oct. 2007.
A. Landragin, C. L. G. Alzar, and W. Yan, "Towards high sensitivity rotation sensing using an atom chip," Research in Optical Sciences (2012), paper JT2A.10, p. JT2A.10, Mar. 2012.
W. Yan, S. Bade, M. A. Buchet, A. Landragin, and C. Alzar, "Atom chip based guided atom interferometer for rotation sensing," egas. lu.lv (Copy to be located).
S. J. Kim, H. Yu, S. T. Gang, D. Z. Anderson, and J. B. Kim, "Controllable asymmetric double well and ring potential on an atom chip," Phys Rev A, vol. 93, No. 3, 2016.
Y. J. Wang, D. Z. Anderson, V. M. Bright, E. A. Cornell, Q. Diot, T. Kishimoto, M. Prentiss, R. A. Saravanan, S. R. Segal, and S. J. Wu, "Atom Michelson Interferometer on a chip using a Bose-Einstein condensate," Phys. Rev. Lett., vol. 94, No. 9, 2005.
J. A. Stickney, D. Z. Anderson, and A. A. Zozulya, "Increasing the coherence time of Bose-Einstein-condensate interferometers with optical control of dynamics," Phys Rev A, vol. 75, No. 6, Jun. 20.
Nshii, C., M. Vangeleyn, M., Cotter, J. P., Griffin, P. F., Hinds, E. A., Ironside, C. N., . . . Arnold, A. S. (2013). A surface-patterned chip as a strong source of ultracold atoms for quantum technologies. Nature Nanotechnology, 321-324.
Saijun Wu, Edward Su, Mara Prentiss, "Demonstration of a moving guide based atom interferometer for rotation sensing" Oct. 18, 2018.
Mark Keil, Omer Amit, Shuyu Zhou,y David Groswasser, Yonathan Japha, and Ron Folman Department of Physics, Ben-Gurion University of the Negev, Be'er Sheva 84105, Israel, "Fifteen Years of Cold Matter on the Atom Chip: Promise, Realizations, and Prospects", May 18, 2016.
B. Barrett, R. Geiger, I. Duttab, M. Meunier, B. Canuel, A. Gauguetc, P. Bouyer, A. Landragin, The Sagnac effect: 20 years of development ,in matter-wave interferometry, Dec. 1, 2014.
JianCheng Fang and Jie Qin, "Advances in Atomic Gyroscopes: A View from Inertial Navigation Applications", Sensors 2012, 12, 6331-6346; doi:10.3390/s120506331, May 11, 2012.
K. Bongs, S. Burger, G. Birkl, K. Sengstock,1 W. Ertmer, K. Rz,a'zewski, A. Sanpera, and M. Lewenstein, "Coherent Evolution of Bouncing Bose-Einstein Condensates", Physical Review Letters, vol. 83, No. 18, Nov. 1, 1999.
H. J. Metcalf, "Laser Cooling and Trapping of Neutral Atoms", Journal of the Optical Society of America B • May 2003.
William D. Phillips, "Laser cooling and trapping of neutral atoms", Reviews of Modern Physics, vol. 70, No. 3, Jul. 1998.

\* cited by examiner

SHAKEN-LATTICE MATTER-WAVE GYRO

BACKGROUND

Inertial navigation systems, e.g., those used in cars, ships, submarines, aircraft, missiles, and spaceships, help track linear and angular motion using, respectively, accelerometers and gyroscopes, "gyros". Herein, a "gyro" is a device used for measuring angular velocity. A classical mechanical gyroscope includes a spinning wheel or disc in which the axis of rotation is free to assume any orientation by itself. When rotating, the orientation of this axis is unaffected by tilting or rotation of the mounting, due to the conservation of angular momentum.

Laser gyros, e.g., ring-laser gyros and fiber-optic gyros, measure angular velocity as a function of shifts in interference patterns between two counter-propagating laser beams. While they can achieve greater precision than mechanical gyros, the precision of a laser gyro is limited by the wavelength of the laser light used to create the interference pattern. In principle, smaller wavelengths can be achieved using matter waves, i.e., de Broglie waves associated with atoms, to enable low cost, robust, and highly-accurate inertial sensors. Development work on atom-based gyros is ongoing.

DETAILED DESCRIPTION

In a matter-wave gyro, particle-bearing traps counter-propagate plural times about a closed path. Upon detection, the particles form an interference pattern, from which an angular momentum or related parameter can be evaluated. In accordance with their wave functions, each particle propagates with each trap. The wave functions collapse when the traps are probed by lasers, resulting in an interference pattern, the position of which is a function of angular velocity. In an embodiment, in this case, a shaken lattice atomic gyro (aka, "SLAG") the particles are ultra-cold atoms from Bose-Einstein Condensates (BECs) and the traps are three-dimensional optical lattices formed by interfering laser beams. The optical lattices are moved about the closed path (e.g., a Sagnac loop) by "shaking", i.e., phase and frequency modulating, the laser beams. Frequency and phase modulation can also be used to cool and load the atoms into the lattices and to recombine them for the angular velocity measurement. Herein, the term "particle" encompasses atoms and molecules. "Atom" encompasses neutral atoms and ions.

The particles are trapped so that their positions relative to each are substantially fixed as they go around the closed path. This helps limit inter-particle interactions that might otherwise contribute noise to the desired angular momentum measurements. The speed of counter-propagation can be fast enough so the particles are not significantly disturbed by the passing of the other trap and its contents. This allows the counter-propagation to proceed two or more times around the loop before or between measurements, increasing the effective area circumnavigated, and thus increasing the spatial resolution of the measurements. In fact, one can trade off spatial resolution and temporal resolution by setting a number of revolutions between measurements. This is in contrast to some other Sagnac-type gyros for which the effective path length is fixed to a single traversal of the path.

Figure 1:
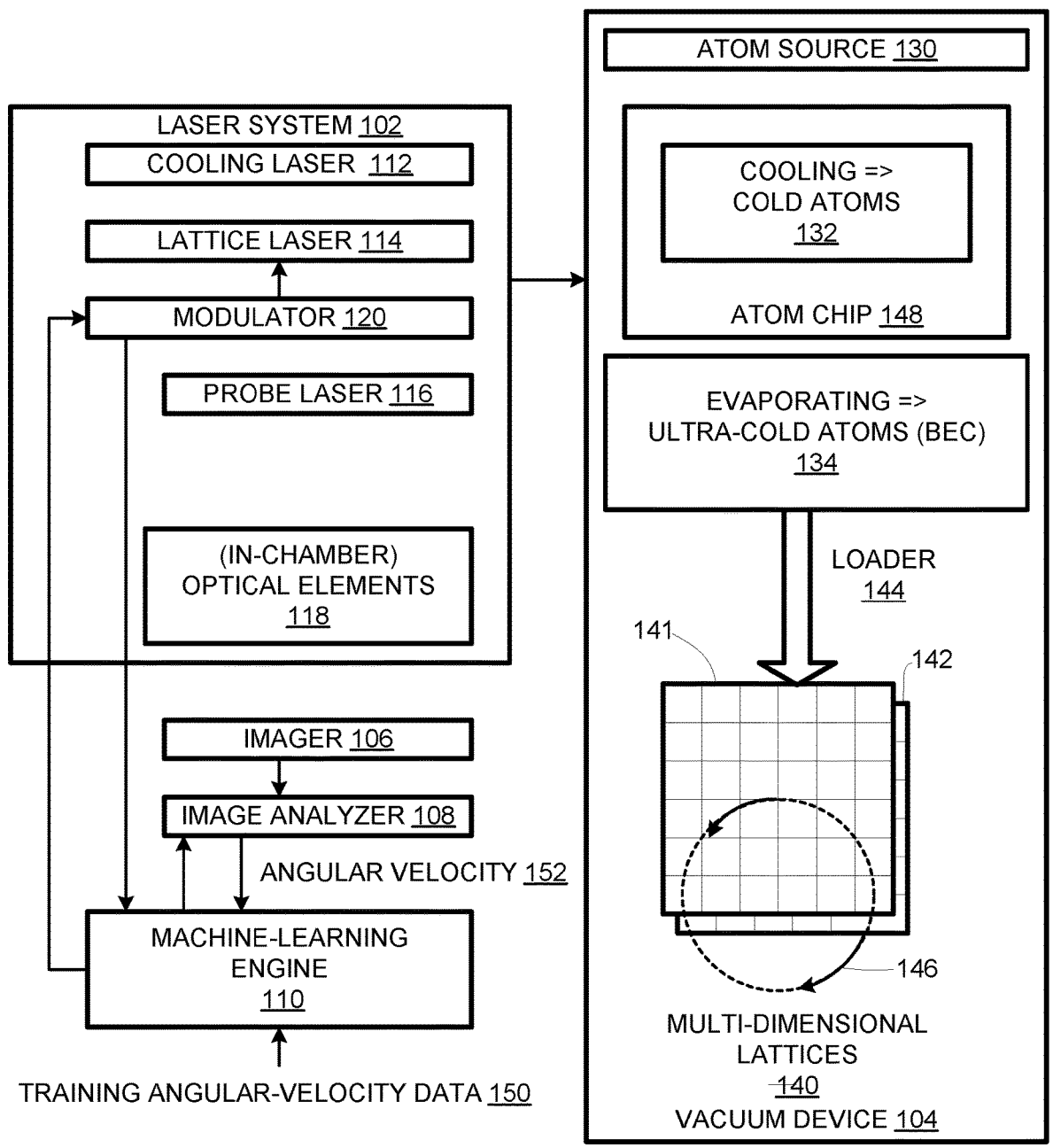
FIG. 1 is a schematic diagram of a matter-wave, e.g., atom, gyro with counter-propagating traps.

As shown in FIG. 1, a SLAG 100 includes a laser system 102, a vacuum chamber 104, an imager 106, an image analyzer 108, and a machine learning engine 110. Laser system 102 can include one or more lasers, e.g., a cooling laser 112, a lattice laser 114, and a probe laser 116. Cooling laser 112 is used to cool atoms as they are introduced; lattice laser 114 is used to establish the lattices to be counter-propagated, as well as other lasers to transfer particles. The probe laser 116 is designed to interrogate the trapped ultra-cold atoms so that they can be imaged. Other lasers can include a laser for forming a potential well for evaporating cold atoms to yield ultra-cold atoms, and a laser for producing lattices that can be chirped to transfer cold and ultra-cold atoms. However, depending on the embodiment, some lasers can perform multiple functions.

Laser system 102 includes optical elements 118 for guiding, splitting, and recombining laser beams. Most of these optical elements reside in vacuum device 104, the interior of which can be accessed by lasers through transparent walls and/or windows of vacuum device 104. Laser system 102 includes a modulator 120, which serves to modulate laser beams produced by laser system 102, e.g., to cause the fringes of interference patterns produced by the laser system to shift, e.g., so that entrained atoms can be transported.

Vacuum device 104 includes an atom source 130, e.g., a Rubidium, Cesium, or Strontium source. In other embodiments, a source of other particles, e.g., other neutral atoms, ion (charged atoms), and molecules, can be used. In the illustrated embodiment, source 130 is located within the vacuum device 104. However, in other embodiments, the source can be external and the particles are injected into the vacuum device.

Atoms introduced from atom source 130 are cooled by cooling laser 112 as they enter a cooling region 132, which may be the site of a trap such as a magneto-optical trap (MOT) or an optical trap. The resulting cold atoms are further cooled at evaporating region 134 to produce a Bose-Einstein Condensate of ultra-cold atoms. Evaporation region 134 may be the site of a MOT or optical trap. An optical trap is preferred as the laser light used to form a potential well for the evaporative cooling is much less prone to affect nearby regions than are the magnetic fields that would be used in a MOT.

Figure 2:
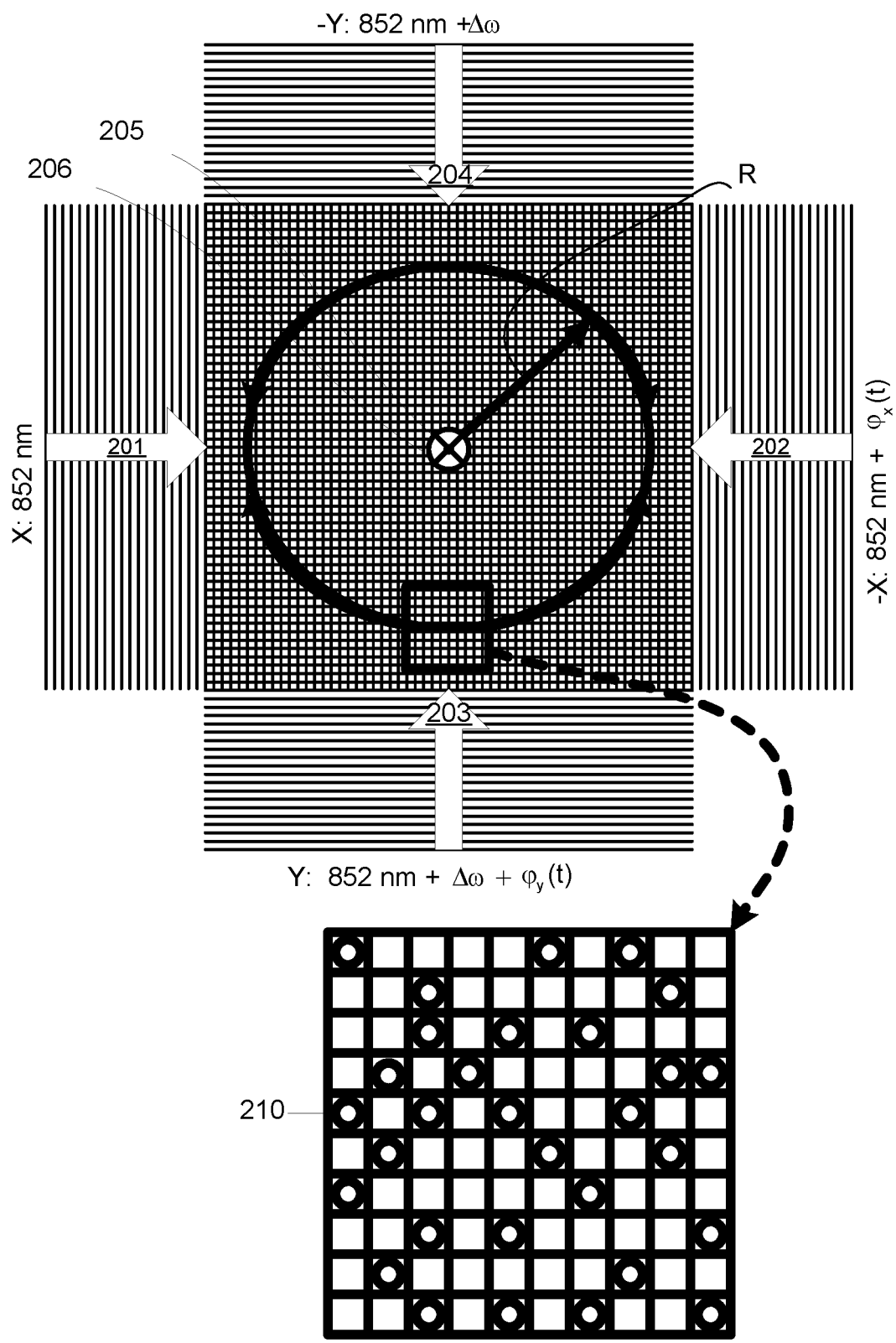
FIG. 2 is a schematic diagram of a cross-section of a 3-D matter-particle, e.g., ultra-cold atom, trap, e.g., optical lattice.

Lattice laser 114 is used to form multi-dimensional lattices 140, including lattices 141 and 142, within vacuum device 104. As shown in FIG. 2, three-dimensional lattice 141 is formed using three pairs of interfering beams. Laser beams 201 and 202 propagate in the −X and +X directions, respectively, and so interfere to produce a one-dimensional lattice of interference fringes that extend vertically in FIG. 2. Laser beams 203 and 204 propagate in the +Y and −Y directions respectively and, so, produce a one-dimensional lattice of interference fringes that extend horizontally in FIG. 2. Laser beams 205 and 206 extend in the +Z and −Z directions respectively, forming a one-dimensional lattice of interference fringes (not shown) that extend orthogonal to the sheet of FIG. 2. Lattice 142 is structured analogously.

The one-dimensional lattices formed by laser beams 201-204 intersect to define a two-dimensional lattice with intersecting fringes. Atoms 210 tend toward the intersection of bright fringes, as indicated in the detail of FIG. 2. Note that lattice 141 may be sparsely populated to minimize inter-atom interactions. The one-dimensional lattice formed by laser beams 205 and 206 serves to prevent atoms from escaping from the two-dimensional lattice.

Ultra-cold atoms have negligible kinetic energy. A loader 144 transfers the ultra-cold atoms from evaporation region 134 to lattices 140. Loader 144 includes elements of laser system 102 that form a one-dimensional lattice, which is chirped (the laser frequency is ramped up or down) so the interference fringes of the loader lattice move toward lattices 140. Once the ultra-cold atoms are in place, the power for lattices 140 is ramped up, while the power to the loader lattice is extinguished, thus trapping the ultra-cold atoms in lattices 140.

Once lattices 140 are loaded, they can be counter-propagated about a closed path, in this case a circular path 146. As shown in FIG. 1, lattice 141 is translated (without changing its orientation) about path 146 in a counter-clockwise direction, while lattice 142 is translated in a clockwise direction about path 146. Typically, each lattice traverses path 146 more than once before a measurement or between measurements.

Vacuum device 104, includes an atom chip 148, which, advantageously, constitutes a wall of vacuum device 104 and provides for electrical access to the interior of vacuum device 104. One function of atom chip 148 is to provide currents to form magnetic fields, used, for example, in some embodiments to form magneto-optical traps for cooling and for evaporation. In other embodiments, the traps are fully optical.

Note that each ultra-cold atom can be characterized by a distribution of possible locations, some of which "belong" to lattice 141 and some of which belong to lattice 142. The positions may be interrogated at some point while they lattices are counter-propagating using probe laser 116. Probe laser 116 may dislodge some or all of the ultra-cold atoms so that they impact imager 106 to capture an interference pattern. The image can be analyzed by image analyzer 108 to evaluate any shift relative to a position associated with zero angular momentum. Any such shift is then converted to an angular momentum or another parameter associated with angular momentum.

Machine learning engine 110 is used in a calibration mode to set the phase and frequency functions according to which modulator 120 controls lattice laser 114 and other lasers. To this end, during calibration mode, training angular velocity data 150 can be used. Machine learning engine 110 can be set to minimize errors, that is, differences between training angular velocity values and angular velocity values 152 output from image analyzer 108.

Figure 3:
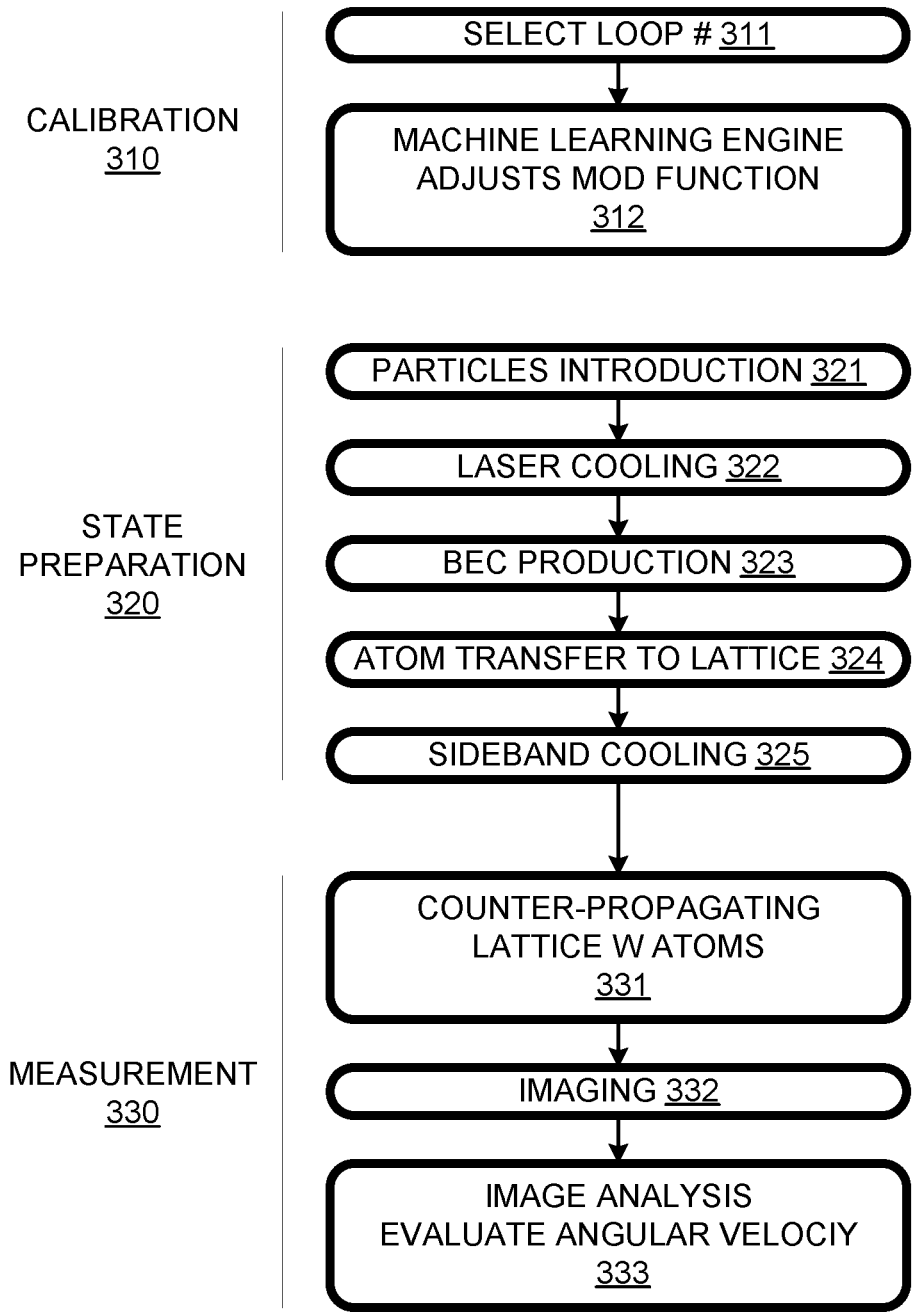
FIG. 3 is a flow chart of a matter-wave gyro process.

A matter-wave-gyro process, flow charted in FIG. 3, includes a calibration phase 310, a state-preparation phase 320, and a measurement phase 330. During calibration phase 310, at 311, a loop number N is selected representing the number of times the multi-dimensional lattices are to move around the closed path before a measurement or between measurements. Selecting a higher N, e.g., 32, results in greater sensitivity (spatial resolution), while a lower N, e.g., 3, can reduce the time between measurements to achieve greater temporal resolution.

At 312, machine learning engine 110 trains, e.g., programs, modulator 120 with optimal modulation phase and frequency functions of time, and trains image analyzer with functions for converting interference images to angular momentum based on training data with known angular momenta.

At 321 of state preparation phase 320, particles (e.g., neutral atoms, ions, molecules) are introduced in a vacuum device. At 322, the particles are cooled to yield a population of cold particles. At 323, the cold-particle population is evaporated, i.e., the higher energy cold atoms are allowed to escape, leaving a Bose-Einstein Condensate (BEC) of ultra-cold particles. At 324, the ultra-cold particles are transferred to the multi-dimensional lattices. At 325, sideband cooling is performed. Sideband cooling is a laser cooling technique allowing cooling of tightly bound atoms and ions beyond the Doppler cooling limit, potentially to their motional ground state.

At 331 of measurement phase 330, the multi-dimensional lattices are counter propagated plural times about a closed path. Since the lattices are at least partially populated with ultra-cold particles, the portions of the probability distribution for each ultra-cold particle are also counter-propagated about the closed path. In the illustrated embodiment, the closed path is circular with a radius of 1 mm and an area of pi mm$^2$. In other embodiments, other areas are enclosed, e.g., areas between 1 mm$^2$ and 10 mm$^2$. Other areas may be appropriate for other atom moieties and other particle types.

At 332, the circulating ultra-cold particles are imaged. To this end, they may be probed by a laser, dislodged from the lattice so that they fall on a imager to form an interference pattern. Note that the z-dimension lattices may be shut off during imaging to allow ultra-cold particles to exit the multi-dimensional lattices. At 333, the interference-pattern image is analyzed to determine an offset of the interference pattern and to determine a value for angular momentum or related parameter based on the offset.

Of course, process 300 can be repeated to provide a series of angular momentum measurements. For example, the successive iterations can be discrete in that process 300 particle introduction 321 for a second iteration follows imaging 332 for a first iteration. (Calibration 311 need not be repeated for every iteration.) On the other hand, iterations of process 300 can be pipelined. For example, during image analysis 333 for a fourth iteration, counter-propagation 331 can be performed for a third iteration, while BEC production 323 is performed for a second iteration, and laser cooling 322 occurs for a first iteration. Pipelining iterations of process 330 increases the repetition rate for measurements so as to achieve higher temporal resolution for a series of measurements.

Some embodiments provide for transfers 324 while the lattices are stationary and superimposed. However, some embodiments provide for an alternative mode in which the lattices are loaded while they are moving. For example, the ultra-cold atoms can be split during transfer and the resulting branches can be directed so that they match the tangential velocities of the lattices. Once the branches are synchronized with respective lattices, the power to the lattices can be increased while the transfer lattices are extinguished, In some embodiments, imaging 332 only partially depletes the lattices and the synchronized loading is used to replenish the partially depleted lattices.

Figure 4:
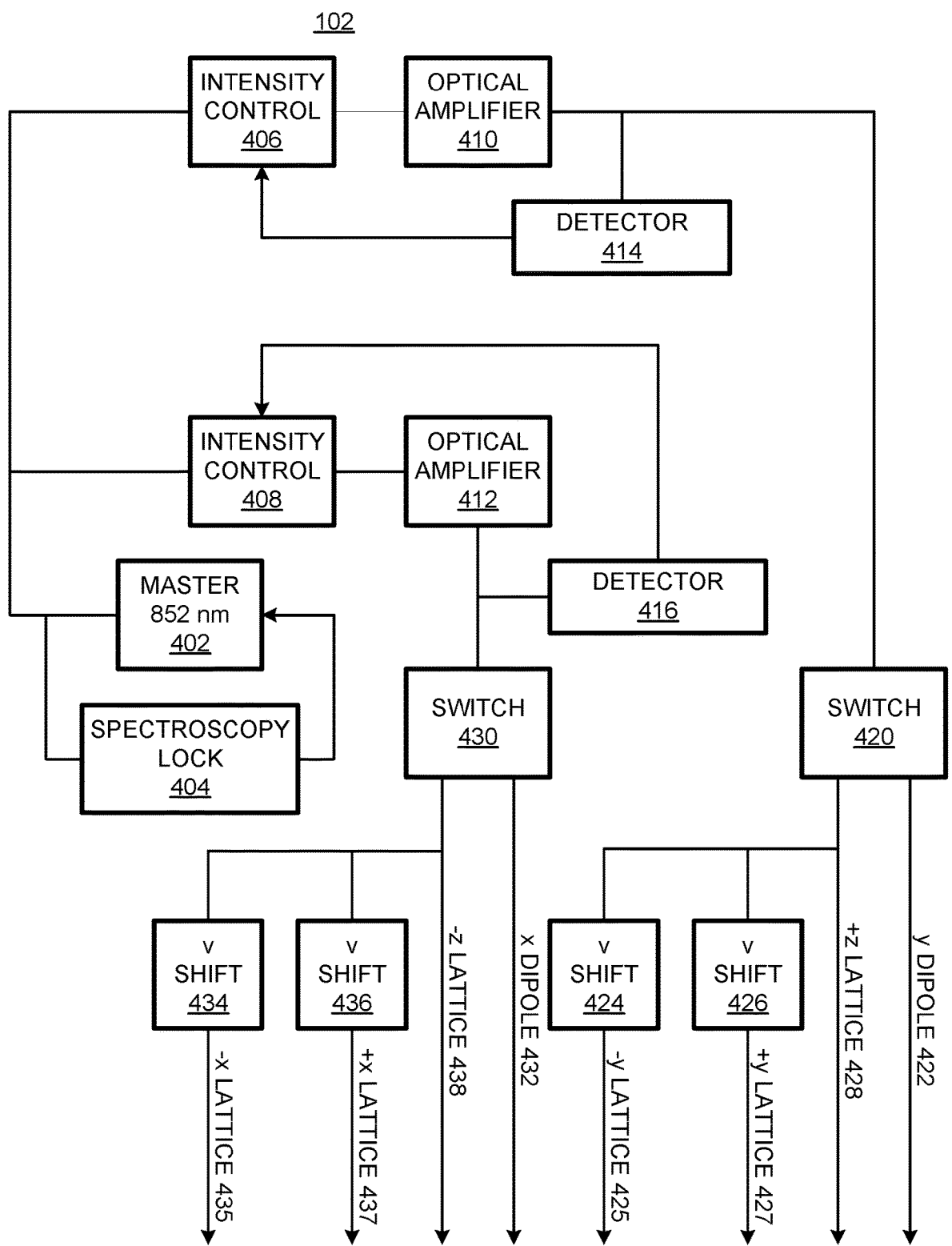
FIG. 4 is a schematic diagram of a laser system of the gyro of FIG. 1.

A portion of laser system 102 is shown in FIG. 4, illustrating how one (e.g., the lattice laser) can produce the laser beams used for counter-propagation and measurement. An 852 nanometer (nm) laser master 402 emits light of a desired wavelength. 852 nm is chosen in the illustrated embodiment as it is readily tuned using a Cesium-based spectroscopy lock 404. As is understood by those skilled in the art, the laser light can be redirected using fully-reflective mirrors and can be split using mirrors that are partially reflective and partially transmissive.

852 nm light emitted by master 402 is tapped as an input to spectroscopy lock 404 and the remainder is split between intensity controllers 406 and 408. The outputs of intensity controllers 406 and 408 are input respectively to optical amplifiers 410 and 412. The outputs of optical amplifiers 410 and 412 are respectively tapped to provide respective inputs to detectors 414 and 416. The outputs of detectors 414 and 416 are fed back as control signals to intensity controllers 406 and 408 so that the outputs of optical amplifiers 410 and 412 can be regulated independently.

The untapped portion of the output from optical amplifier 410 is directed to a switch 420. Switch 420, when in a first switch position, directs light from optical amplifier 410 for use as a Y dipole 422 during measurement. Switch 420, when in a second switch position, directs light from optical amplifier for use in forming lattice 140. More specifically, the light output from switch 420, when in its second position, is divided into three beams. One of the three beams is directed to a shift (modulator) 424 that outputs a beam 425 used for form a −y one-dimensional lattice, another of the three beams is directed to a shift 426 that outputs a beam 427 used to form the +y one-dimensional lattice that forms a +Y lattice. The third beam 428 is used to form the +Z lattice.

The untapped portion of the output from optical amplifier 412 is directed to a switch 430. Switch 430, when in a first switch position, directs light from optical amplifier 412 for use as an X dipole 432 during measurement. Switch 430, when in a second switch position, directs light from optical amplifier 412 for use in forming lattice 140. More specifically, the light output from switch 430, when in its second position, is divided into three beams. One of the three beams is directed to a shift (modulator) 434 that outputs a beam 435 used in forming a −x one-dimensional lattice, another of the three beams is directed to a shift 436 that outputs a beam 437 used to form the +x one-dimensional lattice that forms a +x lattice. The third beam 428 is used to form the −Z lattice.

Gyro 100 (FIG. 1) is more specifically characterized as a Shaken-lattice atomic gyroscope (SLAG). This type of gyro is based on shaken-lattice interferometry (SLI), a technique first proposed and subsequently demonstrated by the Anderson group at the JILA Institute of the University Of Colorado (UCB). C. A. Weidner, H. Yu, R. Kosloff, and D. Z. Anderson, "Atom interferometry using a shaken optical lattice," *Phys Rev A*, vol. 95, no. 4, p. 043624, April 2017. C. A. Weidner and D. Z. Anderson, "Experimental Demonstration of Shaken-Lattice Interferometry," *Phys. Rev. Lett.*, vol. 120, no. 26, 2018.

In its simplest rendition, SLAG utilizes atoms confined to a two-dimensional optical lattice produced by a pair of intersecting, mutually incoherent, optical lattice fields, as illustrated in FIG. 2. The two light fields are phase and frequency modulated ("shaken") in such a way that atoms propagate in a loop that encloses a finite and closed area. Physical operations analogous to those used in a fiber optic gyroscope (FOG) are produced by appropriately modulating the optical lattice. The path can be a nominally circular, 1 mm radius, Sagnac loop. "Sagnac" is named after Georges Sagnac who, in 1913, noted the effect of a rotation on a fringe phase shift. See P. Boyer, "The Centenary of Sagnac Effect and Its Applications: from Electromagnetic to Matter Waves, *ISSN* 2075_1087, *Gyroscopy and Navigation*, 2014, Vol. 5, No. 1, pp. 20-26. Pleiades Publishing, Ltd., 2014.

One advantage of this configuration is that various tradeoffs between response time (temporal resolution) and sensitivity (spatial resolution) can be selected by choosing the number of round trips over the circular path taken prior to a measurement or between measurements. For example, a 100 mm$^2$ enclosed area can be achieved with 32 round trips traversed by ultra-cold rubidium ($^{37}$Rb) atoms in 1 s. System demonstration under this effort requires approximately 6 W of optical power at $\lambda_L$=852 nm. This system meets the challenging demands of high-performance rotation sensing in a real-world dynamic environment.

SLAG utilizes trapping forces that can be as high as several tens of g's. (where g is the acceleration due to the Earth's gravity) thereby making the interferometer robust against dynamic forces of a real-world environment and virtually insensitive to orientation. The straightforward ability to increase effective enclosed area with multiple circuits around the Sagnac loop means that the gyro sensitivity can scale largely independently of system size (in contrast to free-space interferometers). The large trapping forces enable high-sensor-bandwidth operation by enabling atoms to be accelerated to high velocity. In the shaken-lattice context, they also provide a straight-forward way to dynamically adjust the tradeoff between rotation sensor bandwidth and sensitivity.

Sagnac loop geometry, and therefore scale factor, are primarily set by digitally controlled, highly reproducible phase/frequency modulation signals applied to light beams and thus is relatively immune to drifts due to thermal effects, vibration, and so forth. While strong trapping in an atom waveguide approach to interferometry tends to exacerbate the deleterious effects of atom interactions, a lattice can be made sparsely populated to minimize atom interactions while still accommodating a sufficient number of atoms to attain good atom shot-noise performance.

Moreover, in an embodiment, the shaken-lattice approach is implemented in PIC (Photonic Integrated Circuit) integration and integration with all optical approaches to BEC (Bose-Einstein Condensate). In particular, the illustrated embodiment is based on standard 780 nm and 852 nm diode laser wavelengths, and operation involves intensity and phase/frequency control that can all be accomplished with integrated electro-optic modulators and linear optical elements. See C. J. E. Straatsma, M. K. Ivory, J. Duggan, J. Ramirez-Serrano, D. Z. Anderson, and E. A. Salim, "On-chip optical lattice for cold atom experiments," *Opt Lett*, vol. 40, no. 14, pp. 3368-3371, 2015.

In summary, the following advantages have been achieved. Atoms are confined to an optical lattice with high trapping forces thus allowing a Sagnac device to operate in relatively harsh dynamic environments. For the purposes here, they enable orientation invariance of system operation. Among the various approaches to trapping atoms (optical fields, magnetic fields, radio-frequency fields) optical lattices have been the most successfully used to provide such large trapping forces without introduction of substantial noise that would cause decoherence in an interferometer.

The entire laser system, including phase and frequency modulation, is amenable to PIC integration. Scale factor is real-time programmable and knowable to high precision as it is precisely determined by lattice wavelength and digitally reproducible signals driving phase and frequency shifters. For similar reasons, gyro scale factor is robust against thermal changes and other environmental factors. The real-time programmable scale factor allows tradeoff between gyro sensitivity and bandwidth.

A high-repetition rate Bose-Einstein Condensate (BEC) provides the low temperature, quantum state atoms needed to load the Sagnac interferometer, as well as the shaken-lattice method and atom transport, as described above. See D. M. Farkas, K. M. Hudek, E. A. Salim, S. R. Segal, M. B. Squires, and D. Z. Anderson, "A compact, transportable, microchip-based system for high repetition rate production of Bose-Einstein condensates," *Appl Phys Lett*, vol. 96, no. 9, p. 093102, 2010.

This approach leverages the considerable community knowhow regarding ultra-cold atoms trapped by optical lattices, which, in fact, is the basis of the world's most accurate clocks. A. D. Ludlow and J. Ye, "Progress on the optical lattice clock," *Comptes Rendus Physique*, vol. 16, no. 5, pp. 499-505, June 2015. This is evidence that lattice light technical noise that might otherwise lead to gyroscope performance degradation can be sufficiently mitigated. Performance metrics such as Allan deviation, which impose constraints on experimental parameters such as atom number, are by themselves reasonably modest (i.e. atom numbers in the range of a few thousand are routine. Likewise, metric-derived specifications such as atom lifetime (which in turn constrains vacuum performance), are achieved. Algorithms are used for the control and manipulation of the ultra-cold atoms trapped in the lattice.

Herein, the "Sagnac lattice potential" is a superposition of moving lattices and provides the basis of rotation sensing and serves as the context for sensor design and gyro system design. A classical interpretation of lattice forces is presented below to explain orientation invariance and robustness in dynamic environments.

An objective of atom-based Sagnac interferometry is to cause matter waves to be split into two counter-propagating waves propagating around a closed path, e.g., a loop, and then be recombined to produce a phase signal indicative of rotation rate in the plane of the loop. In the shaken-lattice approach, atom trapping forces are provided by an optical lattice, and interferometry, that is, splitting, propagation, and recombination, is carried out by appropriately time-varying the position of the nodes and antinodes of the lattice. While the Sagnac gyroscope requires, in principle, a two-dimensional lattice, a one-dimensional lattice is considered initially for the sake of gaining physical insight. The atomic potential generated by a standing light field (one dimensional lattice) of wave number $k_L$ is given by equation 1:

$$V(x) = \frac{V_0}{2}\cos(2k_L x + \phi) \quad (1)$$

where the amplitude $V_0$ is determined by the optical intensity and $\varphi$ is, for now, an arbitrary phase reference.

It is conventional to express the lattice amplitude in units of the atomic recoil energy, $$E_R = \frac{\hbar^2 k_L^2}{2m} \quad (2)$$

where $\hbar$ is the reduced Planck's constant and m is the atomic mass ($^{87}$Rb in our case, and for $\lambda_L$=852 nm, $E_R/\hbar$, $2\pi\times3.2$ kHz. The possibility to implement interferometry in a lattice, Sagnac or otherwise, is based on the pioneering work by Pötting et al. See S. Pötting, M. Cramer, and P. Meystre, "Momentum-state engineering and control in Bose-Einstein condensates," *Phys. Rev. A*, vol. 64, no. 6, p. 063613, November 2001. These authors showed that the momentum state of an ensemble of atoms can be transformed from an initial state to some desired final state by appropriately shaking the lattice, that is, by causing the phase of the lattice to become time-dependent, $\phi \to \phi(t)$, in a specific way.

Some insight into the realization of Potting et al. can be gleaned by considering Bloch state diagrams that present the energy versus quasi-momentum for lattices of two different depths. As Bloch states form a complete set, any state within the lattice can be expressed as a superposition of Bloch states. Transforming from one state to another involves transitions among the various Bloch states. Thus, the phase modulation can be expected to be comprised of combinations of transition frequencies. See C. A. Weidner and D. Z. Anderson, "Simplified landscapes for optimization of shaken lattice interferometry" *New J. Phys.*, vol. 20, no. 7, 2018. In general, it is not possible to discover an appropriate modulation analytically. Pötting et al. thus utilized a genetic algorithm to "learn" a $\phi(t)$ that served to accomplish the momentum transformation of interest.

In one-dimension, interferometry is accomplished by a sequence (or sequences) of four physical operations: beam splitting, propagation (or transport), reflection, and recombination. Splitting and recombination are typically the first and last steps, while sequences of propagation and reflection determine interferometer geometry.

In recent work, Weidner and Anderson showed that the basic shaken-lattice concept could be applied to interferometry by learning a set of phase modulation functions $\{\phi_i(t), i=1, 2, 3 \ldots \}$ that would accomplish the appropriate operations. Consider the beam splitting operation: the initial momentum state is that of the atomic ground state of the lattice. One would like to transform that initial state into one that consists of a pair of momenta having equal magnitudes but opposite direction. The beam-splitting operation can be implemented by learning an appropriate $\phi_s(t)$ that accomplishes the task.

Taking just this first operation as an example, it is not intuitively obvious, yet it is nevertheless the case, that shaking the lattice can be used to transform the ground state into a pair of oppositely directed matter waves as suggested by Pötting et al. Weidner and Anderson (ibid) specifically demonstrated an accelerometer based on a matter wave Michelson interferometer by learning a sequence of five phase modulation functions, one each for splitting, propagating, reflecting, reverse propagating, and recombining.

Ideally, an ensemble of atoms in a lattice is characterized by a single wavefunction $\psi(\vec{k})$, in which the momentum space is one, two, or three dimensional corresponding to the dimensionality of the problem. In the case of a lattice, the momentum states are discrete, having values $k_n=\pm 2\ nk_L$, n=1, 2, 3 . . . in one dimension. Experimental measurement can provide only populations indicative of the wave function and not, directly, phase information. Thus, one can measure a set of momentum state populations $\{pn, n=0, \pm1, +2 \ldots \}$. This is normally done by time-of-flight (TOF) imaging in which atoms are released from the lattice by extinguishing the laser light, allowed to fall for a fixed time under the influence of gravity, and then imaged.

One can treat momentum populations as a vector. During the learning process one has a target, or desired momentum population vector $\vec{p}^{(d)}$. In the case of $+2hk_L$, beam splitting, for example, the desired momentum vector is $\vec{p}^{(d)}=(\ldots 0,0,1,0,1,0,0,)/\sqrt{2}$. One can begin with a guess of a shaking function $\phi^{(0)}(t)$ and measure a resulting set of trial populations $\vec{p}^{(0)}$ and form an error parameter $$\mathcal{E} = 1 - \frac{\vec{p}^{(d)} \cdot \vec{p}^{(0)}}{|\vec{p}^{(d)}||\vec{p}^{(0)}|} \quad (3)$$

Note that this error parameter is zero if the trial is identical to the desired momentum population vector. Based on the error, a learning algorithm updates the guess $\phi^{(0)}(t)$ and iterates. Algorithms vary in their details, but the objective is, roughly, to sample the landscape of possible modulation functions and converge on one that minimizes the error. The application of learning techniques in the quantum realm is generally the domain of what is referred to as the field of "quantum control" and more broadly as "optimal control". There is considerable science and art the choice of: 1) parameters that are used to vary the modulation function; and 2) the algorithm used to perform learning using real data. The learning of the set of modulation functions $\{\phi_0(t)\}$ occurs exactly one time as a calibration operation: once the modulation functions are learned, the interferometer can then be used as a sensor.

In standard atom interferometry the rotation or acceleration signal is a phase which is inferred by measuring a pair of momentum populations in analogy with the two ports of an optical interferometer in which one determines an optical phase from measured intensities. In the lattice case, the measured state of atoms is represented by a momentum population signal vector $\vec{p}^{(s)}$ having several rather than two values (for a typical lattice depth of $V_0 \simeq 10E_R$-$20E_R$ between 5 and 7 momentum values have significant population).

The signal in the shaken lattice interferometer thus gives generally more information than the conventional interferometer. For example, there is ambiguity in the direction of rotation or acceleration in standard atom interferometry that must be resolved using one of a few available methods. Directional information is generally present, however, in the larger momentum population vector of the shaken lattice. The phase information is extracted using the Fisher information to calibrate the output momentum population vector, that is, given the interest in rotation sensing, $\vec{p}^{(s)}(\Omega)$. The Fisher information is a way of measuring the amount of information that an observable random variable X carries about an unknown parameter θ of a distribution that models X. Formally, it is the variance of the score, or the expected value of the observed information.

Weidner and Anderson (ibid) showed both numerically and experimentally that the sensitivity of their atom Michelson interferometer to acceleration has the same $\tau^2$ dependence of acceleration sensitivity on interrogation time as the free-space interferometer. One should expect this, since Schrödinger's equation is linear in the atomic potential. Likewise, the shaken lattice Sagnac gyroscope sensitivity scales with enclosed area in the same way as does the free-space gyroscope.

Interferometer sensitivity, whether for acceleration or rotation, scales with dimensions of the interferometer. Moving atoms over a characteristic distance of 1 mm, as in the illustrated embodiment, can be considered a large distance, most meaningfully measured in units of the lattice spacing. Perhaps in contrast to the beam-splitting and propagation operations described above, the possibility of large-distance transport of trapped atoms is easy to understand. A moving lattice can be produced by imposing a frequency difference $\delta\omega$ between a pair of counter-propagating laser beams that is small relative to their optical frequency. In the one-dimensional case the atomic potential:

$$V(t) = \frac{V_0}{2}\cos(2k_L x + \delta\omega t) \quad (4)$$

describes a lattice that moves with phase velocity $$v_p = \lambda_L \cdot \frac{\delta\omega}{4\pi}, \quad (5)$$

where $\lambda_L$ is the lattice laser wavelength. Clearly, such a lattice has identical Bloch states as a stationary one, except translated to account for the energy and momentum shifts relative to a stationary frame.

By chirping the frequency difference, one can also accelerate or decelerate atoms. For example, the moving lattice potential:

$$V(t) = \frac{V_0}{2}\cos(2k_L x + \delta\omega t \sin(\nu t)) \quad (6)$$

accelerates from a standstill, then decelerates the lattice to a standstill, translating it (and trapped atoms) a distance $\Delta x = \lambda_L \delta\omega/\nu$ in a time $2\pi$. In a time the lattice returns to its original position. The Anderson group, for example, used a frequency chirped standing light field to transport cold cesium atoms a distance of over 0.5 mm and back again in a time of 20 ms, achieving a peak velocity of over 200 mm/s. See B. A. Dinardo and D. Z. Anderson, "A technique for individual atom delivery into a crossed vortex bottle beam trap using a dynamic 1D optical lattice," *Review of Scientific Instruments*, vol. 87, no. 12, p. 123108, December 2016. Note that the latter corresponds to imposing a mean acceleration of about 4 g onto the atoms.

The potential $$V(t) = \frac{V_0}{4}[\cos(2k_L x - \delta\omega t) + \cos(2k_L x + \delta\omega t)] \quad (7)$$

evidently describes a pair of moving standing light fields propagating with equal speeds moving in opposite directions. It proves to be the case that for sufficiently large lattice velocities $v_p \gg \hbar k_L/m$, atoms that are trapped in one moving lattice "see" only the time-averaged potential of the other moving lattice rather than its bumps and valleys. The SLAG approach utilizes this property to establish high-speed large-distance counter-propagating transport of atoms.

Potentials such as the one of Eq. (7) that involve frequency shifting can be well-approximated by phase modulation such as:

$$V(t) = \frac{V_0}{2}\cos(2k_L x - \alpha \sin(\omega_m t)) \quad (8)$$

A Bessel function expansion of this potential shows that setting $\alpha = 2.408$, i.e. to the root of the zeroth order Bessel function, yields the counter-propagating potential with $\delta\omega = \omega_m$ plus higher order sidebands that can be ignored for sufficiently large $\omega_m$.

Sagnac interferometry requires the transport of atoms around a loop in two dimensions. To this end, the SLAG can use a two-dimensional lattice produced by a pair of lattices, one each oriented in the x- and y-direction, formed from mutually incoherent laser beams (though with nearly the same wavenumber). While nearly any two-dimensional path can be achieved, a two-dimensional moving lattice executing circular transport is remarkably easy to produce with frequency shifting.

The potential:

$$V(t) = \frac{V_0}{2}\{\cos[2k_L(x - R\cos(\nu t))] + \cos[2k_L(y - R\sin(\nu t))]\} \quad (9)$$

circular motion with radius R and period $\tau=2\pi/\nu$. One can think of such a lattice as an egg crate that is held fixed in orientation but is moved in a circle. The potential can be created by frequency shifting:

$$\delta\omega_x(t)=-R\nu \sin(\nu t)$$

$$\delta\omega_y(t)=R\nu \cos(\nu t) \quad (10)$$

A pair of counter-propagating egg crates is produced by imposing counter-propagating lattices in the x-direction as in Eq. (7):

$$V_s(t) = \frac{V_0}{4}\{\cos[2k_L(x - R\cos(\nu t))] + \cos[2k_L(x + R\cos(\nu t)) + 2\cos[2k_L\{y - R\sin(\nu t))]\} \quad (11)$$

Herein, this is referred to as the "Sagnac Lattice Potential" or "SLP". The SLP plays a primary role in the Sagnac gyroscope, in particular, in propagating atoms one or multiple times around the Sagnac loop. For a visual representation of an "egg crate", see FIG. 14 of H. H. Metcalf "Laser Cooling and Trapping of Neutral Atoms", Journal of the Optical Society of America 8—May 2003, pp. 975-1014.

In a classical interpretation, an atom that is trapped in the SLP and undergoing circular motion is subject to a centripetal force that is constant in magnitude. For a rubidium atom executing circular motion having radius R=1 mm and period $\tau_s$=30 ms, the centripetal acceleration is ac=v2/R=4π2R/$\tau_s$≃4.5 $g^2$, i.e. larger than but comparable to the force of gravity. The centripetal force is supplied by the lattice potential; viewed classically, it is given by the negative gradient of the Sagnac potential. Estimate of the maximum is simply $F_{max}=V_0k_L$. A typical potential amplitude is $V_0\sim10E_R$, corresponding to a maximum force of 110 g, i.e., adequate to accommodate substantial dynamic environments.

Sagnac sensitivity to input rotation scales as the enclosed area and, therefore, as the square of the circular loop radius. The interferometer phase difference $\Delta\Phi$ is determined by the input rotation rate $\Omega$ according to Equation 12:

$$\Delta\Phi = 2\frac{m}{\hbar}A\Omega = 2\pi\frac{m}{\hbar}R^2\Omega \quad (12)$$

Were it not for other technical limitations, one would choose the single-turn loop radius as large as possible. In addition to the direct sensitivity benefit, a single large-area loop also indirectly ameliorates the effects of atomic collisions, since the average distance between atoms, keeping the total number constant, can be larger than with a smaller loop. The primary technical impediment to a larger ring is lattice laser power, since for fixed lattice depth the required power scales at least linearly with radius yet, in reality, more quickly because of beam diffraction. The other technical challenge limiting radius is maintaining uniform lattice beam intensity over a larger cross-section.

R=1 mm is a reasonable compromise between loop size and required laser power and beam intensity uniformity. A single turn of the loop thus encloses A=πR≃3.14 mm² area. Satisfying the metrics requires about 3 turns around the loop for 10 mm² and 32 turns around the loop for 100 mm². Atoms thus propagate around the loop in about 0.031 milliseconds (ms) in the former case and in about 0.2 ms in the latter case.

The lattice laser provides the trapping forces and the ability to transport atoms in the Sagnac interferometer. The choice of laser wavelength involves a direct tradeoff among required power, lattice potential, and atom lifetime due to spontaneous emission. For fixed trapping potential, the required power increases linearly with the detuning of the wavelength away from atomic resonance, while the scattering rate falls off with the square of detuning. It is common in optical lattice experiments to use trapping light of wavelength λ=1.04 μm.

Some embodiments take advantage of the lower power requirements with the choice of $\lambda_L$=852 nm. Moreover, this wavelength is accessible with diode laser technology and also with PICs. 852 nm is selected instead of, for example, 850 nm, because cesium can then be used as a reference to stabilize the frequency if need be. As gyro scale factor is directly tied to the lattice laser wavelength, one can set the scale factor with a precision to well better than a part per billion. There is no extra cost or burden in choosing the 852 nm wavelength.

The Sagnac loop radius of 1 mm requires a lattice beam of somewhat over 2 mm in width, Assuming a target beam thickness of 40 μm as used in the shaken lattice work of Weidner and Anderson, about 0.4 W of laser power at 852 nm is sufficient to provide a lattice depth of $V_0$≃10$E_R$. Effective depth is decreased by a factor of 2 in the case of superposed moving standing light fields. At 0.4 W power, atom lifetime due to spontaneous emission is about 20 s, i.e. sufficient for the 1 s measurement time targeted for the SLAG. 1 W of power per lattice beam can suffice.

Interrogation time is defined as the length of time given to the atoms to enclose 100 mm². The Sagnac atom interrogation time is 1 s, which is a reasonable tradeoff among a number of technical constraints, keeping in mind the performance metrics. Indeed, taken together, interrogation time and duty cycle determine the time-averaged number of atoms that are participating in a rotation measurement. A large mean number of atoms in principle improves Allan deviation. On the other hand, a low atom number reduces the deleterious impact of atom interactions on system performance. A limiting factor is also the time it takes to produce ultra-cold atoms; production times significantly less than 1 second (s) are a challenge. Therefore the 50% duty cycle in which half the time is spent producing ultra-cold atoms and the other half of the time is spent on the measurement may be about optimal.

The atom shot noise limited Allan deviation of the interferometer phase corresponding to a measurement time T is given by the number of atoms N(τ) participating in the measurement by equation 13:

$$\sigma_\Phi(\tau) = \frac{1}{\sqrt{N(\tau)}} \quad (13)$$

A large atom number per measurement thus gives small uncertainty, yet it also gives rise to unwanted atom interactions. 3000 atoms participating in a measurement along with a 50% duty cycle indicates a shot noise performance of $\sigma\Phi=25$ mrad/$\sqrt{s}$. In reality Allan deviation is typically dominated by other-than shot noise sources.

Shaken lattice Sagnac interferometry requires an at least two-dimensional lattice. However, the illustrated embodiment also confines atoms in the axis transverse to the plane of the Sagnac loop with an additional z-axis lattice having modest power. In the one-dimensional shaken lattice work of Weidner and Anderson, interferometer performance was limited by heating of atoms, in particular, excitation of the transverse modes of the atoms. Wholly confining atoms in the transverse plane substantially mitigates transverse excitation. Moreover, the z-axis lattice will address acceleration/tilt invariance metrics. The configuration of the three-dimensional lattice has a high aspect ratio: approximately 2.5 mm×2.5 mm×0.04 mm.

In an embodiment, the SLAG utilizes forced evaporation in an atom-chip-based magnetic potential. However, another embodiment utilizes an optical BEC for two reasons: 1) the needed laser power is already available from the lasers that also supply the lattice light (since BEC and lattices are done sequentially) and, therefore, optical. BEC lowers the total system power requirement; and 2) it simplifies the design and implementation of the 3D lattice since the need for magnetic fields from the atom chip is eliminated, which otherwise interferes with easy optical access of the third dimension of the lattice. Furthermore, higher power metrics are more accessible with the implementation of optical BEG.

Operationally a rotation measurement takes place as a sequence of steps. They are: atom cooling, lattice loading, ground-state cooling, interferometer operation (matter wave beam splitting, Sagnac loading and transport, matter-wave beam combining), then imaging. In an embodiment, the gyro system includes two laser systems each connected via optical fibers to a physics package that serves as the interface between the laser systems and the vacuum system in which the manipulation and control of atoms takes place. The laser system utilized for laser cooling of the rubidium atoms is now standard, as is the use of a double-MOT scheme to enable fast (~1 s) BEC production times.

An 852 nm laser system can be used for producing a 3D lattice as well as optical BEC, In this design, independent frequency control is provided to counter-propagating light. This allows complete flexibility in the ability to apply both frequency and phase modulation to the lattice beams, e.g., phase modulation for carrying out beam splitting, and frequency modulation to establish the Sagnac lattice potential.

Output from the laser systems can be coupled via optical fibers to the physics package. The physics packages are variations on ColdQuanta commercial "Physics Station" products. 2-D and 3-D MOT beam distribution as well as imaging are already built into the Physics Station. Moreover, the system incorporates magnetic coils and an atom chip for the production of BEC using RF forced evaporation. The Physics Station has been modified to accommodate the lattice and optical BEC beams, as well as intensity monitoring detectors for the lattice beams.

A physics package used by Weidner and Anderson for the shaken lattice experiments has been modified to accommodate a two-dimensional lattice. The system has been upgraded to accommodate a new vacuum cell specifically designed to accommodate a 3D lattice. The upgraded system is capable of tilt. A more advanced system incorporates a further advanced vacuum cell and is capable of essentially arbitrary orientation in order to carry out acceleration invariance measurements.

The core of the physics package is the vacuum cell that accommodates a 2D MOT, a 3D MOT and BEC. The cell system utilized here is based on ColdQuanta's commercial RuBECi system (which in turn is based on technology developed at The University of Colorado at Boulder under the DARPA g-BECi program). The majority of beams have standard Gaussian beam cross-sections. Of particular concern, though, is the lattice beam shape, which ideally has uniform intensity across a high-aspect ratio rectangular beam shape and a planar wave front. While classical optical line generators are used in some embodiments to approximate the ideal, other embodiments achieve greater tolerance limits on intensity and wave-front uniformity to achieve higher performance.

The various operations are carried out using a control system based on Lab View software. (Laboratory Virtual Instrument Engineering Workbench is a system-design platform and development environment for a visual programming language from National Instruments.) The system has a user interface tailored to the kind of event timing need for the production and utilization of cold atoms. The present work has additional requirements for control of the lattice beams in particular and therefore the current control system will need upgrading to handle the larger number of control parameters. In addition, the current control systems are not designed to update their control parameters on the basis of measurement feedback from the experimental system. Such capability can greatly speed experimentation and development.

An embodiment uses an integrated vacuum package compatible with the atomic lattice gyro (ALG) based on ColdQuanta's ultrahigh vacuum (UHV) "channel cell" technology. Channel cell technology utilizes a silicon-and-glass construction which lends itself to direct integration with planar waveguide structures and minimizes the complexity of the optical access into the vacuum system. Channel cells can be made to include precision optical components, such as mirrors, gratings, and light collection optics; as well as all necessary UHV system components, including rubidium sources, and passive and active vacuum pumps. Being fabricated from glass and silicon, an incorporating system is able to produce a vacuum system that would normally occupy several liters in a package that is less than 100 cc while maintaining a vacuum in the nano-torr regime. Also, because of the monolithic construction, channel cells provide a high-performance package that is sufficiently robust for demanding environments. In June of 2017, ColdQuanta demonstrated an airborne channel cell-based laser cooling system operating aboard an unmodified Cirrus SR-22—a four seat, single piston engine, general aviation aircraft.

Chip-format Liquid Rb Dispensers (LRD) are used in an embodiment so that rubidium can be delivered with only 30 mW of electrical power. An alternative LRD design incorporates a reservoir with channel features for liquid Rb source material, membrane orifice for puncture/flow, and temperature control features. The LRD takes advantage of micromachining. For the purposes of the channel cell MOT, a relatively simple optics package uses conventional OTS optics. However a more advanced design uses PIC beam distribution technology that utilizes a channel cell vacuum package in conjunction with a PIC distribution system to make a compact, robust, and manufacturable vacuum package, where the precision in the optical alignment has been primarily leveraged onto the PIC.

An embodiment incorporates circularly-polarized grating couplers (CPGCs) which allow any desired polarization of light to be delivered to trapped atoms via on-chip waveguides. These are based upon on-chip single-mode waveguides at the variety of wavelengths useful for atomic physics applications. On-chip waveguides guide a single optical mode below the surface of the trap chip by utilizing the index contrast between the waveguide material and the cladding. Embodiments herein use optimized materials and processes to achieve low optical losses in waveguides over the visible and near infra-red (NIR) spectrum; losses as low as 3 dB/cm have been achieved for wavelengths as low as 370 nm. The waveguides support two orthogonal polarizations (TE and TM) which are transformed by grating coupler into two orthogonal linear polarizations of free-space beams.

The grating couplers direct light out of the chip plane and focus the beam to a desired spot above the chip surface. These gratings are formed by etching the waveguide layer to create a periodic change in refractive index. The grating couplers deliver light with a defined linear polarization, focused spot size as low as 4 µm, and with the angle of grating coupler emission accurately predicted by simulations. Elliptical and circular polarizations of light can be achieved by interfering the linear light polarizations launched from a grating coupler with input from two orthogonal waveguides with a well-defined phase relationship between the two.

The phase relationship between the two beams depends on the waveguide path length difference between the beams, which cannot be defined in fabrication to the sub-wavelength tolerance needed to reproducibly achieve a particular circular polarization of light. Instead, a small heater fabricated into the chip (made of TiN or similar material) can locally heat one of the two waveguide branches to achieve the necessary phase relation between the two beams and achieve circular polarization. Initial calibrations of each CPGC is used to determine the necessary heater current to achieve a desired polarization. The waveguides are sufficiently stable that this calibration step need only be performed once. Embodiments use CPGCs at 780 nm, Other embodiments use CPGCs at other wavelengths. The CPGCs are used for laser cooling. These CPGCs are used in embodiments in which the cold-atom gyroscope is packaged in PIC form.

System operation has two operational phases: 1) a learning/calibration phase in which the final lattice shaking algorithm is itself achieved through a learning algorithm; and 2) a sensing phase in which the now programmed lattice system is usable for rotation sensing. The learning process underlying calibration seeks to vary certain parameters, such as the Fourier components of a particular shaking function. The greater the number of Fourier components that are needed, in general, the slower the learning process. Thus, one would like to minimize the number of parameters, i.e., the dimensionality of the control space. The number of Fourier components can depend a great deal on the Bloch band structure of the lattice, and there is substantial freedom in the design since one can superpose, for example, moving and stationary lattices. Unlike many real-world learning scenarios one can manipulate the physical system to simplify the job of calibration.

Machine learning (ML) has become instrumental in advancing quantum device performance through its application to quantum control. Embodiments use machine learning techniques for state preparation and manipulation for shaken lattice interferometry and acceleration sensing demonstrated and apply similar ideas to rotating and counter-rotating atomic lattices used in a Sagnac interferometer gyroscope. Expertise at applying machine learning to quantum control of solid-state spin ensembles for magnetometry can be transferred to the design of the SLAG.

Various embodiments use stochastic, simplex, and gradient-based methods in determining optimal controls for state preparation and manipulation. The genetic algorithm, a stochastic multidimensional optimization technique, has enabled success in momentum-state engineering. See S. Pötting, M. Cramer, C. H. Schwalb, H. Pu, and P. Meystre, "Coherent acceleration of Bose-Einstein condensates," Phys. Rev. A, vol. 64, no. 2, August 2001 and in shaken-lattice interferometry. However, relatively slow algorithm convergence requires the use of the CRAB and dressed CRAB algorithms for quantum control optimization, which employ gradient-free minimization. See: 1) P. Doria, T. Calarco, and S. Montangero, "Optimal Control Technique for Many-Body Quantum Dynamics," Phys. Rev. Lett., vol. 106, no. 19, 2011; T. Caneva, T. Calarco, and S. Montangero, "Chopped random-basis quantum optimization," Phys. Rev. A, vol. 84, no. 2, 2011; and N. Rach, M. M. Mueller, T. Calarco, and S. Montangero, "Dressing the chopped random-basis optimization: A bandwidth-limited access to the trap-free landscape," Phys. Rev. A, vol. 92, no. 6, 2015.

The underlying Nelder-Mead simplex optimization grows slow as the number of parameters approaches ten. While effective for one-dimensional shaken-lattice interferometry, increasingly powerful techniques are used ford for the shaken lattice Sagnac gyroscope. (See S. Machnes, E. Assemat, D. Tannor, and F. K. Wilhelm, "Tunable, Flexible, and Efficient Optimization of Control Pulses for Practical Qubits," Phys. Rev. Lett., vol. 120, no. 15, p. 8, April 2018.) define quantum optimal control requirements i) flexibility, ii) numerical accuracy, iii) and speed, and propose the gradient optimization of analytic controls (GOAT) which meets these specifications. GOAT is particularly well-suited to shaken-lattice interferometry given the constraints set by band transition frequencies.

Focusing still on the calibration stage for example, how one treats the inevitable noise in the data has a substantial impact on the convergence of the learning process. Especially given the low atom number targeted for gyro experiments, image data will present noise to the learning processes. Reinforcement learning can be used for the control problem, in which complex system dynamics that are not completely known, produce noisy data. This applies to experiment, where both technical noise and atom counting (shot) noise cause significant deviation from simpler models in which conventional optimization succeeds. See S. Gupta, K. W. Murch, K. L. Moore, T. P. Purdy, and D. M. Stamper-Kurn, "Bose-Einstein condensation in a circular waveguide," Phys. Rev. Lett., vol. 95, no. 14, 2005.

In the case of technical noise, deep reinforcement learning can directly learn control policies from high-dimensional sensory input, such as the pixelated screen of Atari games, by replacing the agent of a conventional reinforcement learning framework with a deep neural network. See V. Mnih, K. Kavukcuoglu, D. Silver, A. Graves, I. Antonoglou, D. Wierstra, and M. Riedmiller, "Playing Atari with Deep Reinforcement Learning," arXiv.org, vol. cs.LG. 19 Dec. 2013; and V. Mnih, K. Kavukcuoglu, D. Silver, A. A. Rusu, J. Veness, M. G. Bellemare, A. Graves, M. Riedmiller, A. K. Fidjeland, G. Ostrovski, S. Petersen, C. Beattie, A. Sadik, I. Antonoglou, H. King, D. Kumaran, D. Wierstra, S. Legg, and D. Hassabis, "Human-level control through deep reinforcement learning," Nature, vol. 518, no. 7540, pp. 529-533, 2015.

For the shaken-lattice atomic gyroscope, the state is an image of the split atoms, the action a control protocol, and the reward a measure of interferometer or gyroscope performance, i.e. minimization of the Allan deviation of phase or rotation rate, respectively. This harnesses graphics processor unit (GPU) accelerated desktop and supercomputing systems for model training, validation, and testing.

For a review of atom Sagnac interferometry by one of the pioneers in free-space systems, see P. B. G. A. Navigation 2014, "The centenary of Sagnac effect and its applications: From electromagnetic to matter waves," Springer.) The majority if not all of the work on trapped atom Sagnac matter-wave rotation sensors utilize trapping potentials that confine atoms relatively tightly in two dimensions and loosely, or not at all, in the third "waveguide" dimension. Trapping forces are produced by magnetic, optical fields or radio-frequency (RF) fields. Enclosed area is achieved by one of two concepts: either the potential itself is ring shaped, i.e., resembling a one-turn Sagnac fiber loop, or a one-dimensional waveguide is transported in the transverse direction, first one way and then returned, while the atoms are otherwise propagating along the guide. In the case of optical guides, ring structures can either be produced directly (e.g., an optical torus) or "painted" by scanning one or more laser beams to create the desired geometry at a rate that atoms do not "see" the time variations. See K. Henderson, C. Ryu, C. MacCormick, and M. G. Boshier, "Experimental demonstration of painting arbitrary and dynamic potentials for Bose-Einstein condensates," New J Phys, vol. 11, no. 4, p. 043030, April 2009. Circular magnetic potentials can likewise be made in a few ways, such as sequentially excited circular segments (somewhat like a synchronous motor) or by an appropriate arrangement of coils.

All the approaches to date suffer from very similar sets of challenges that arise when the trapping forces are weak, of which there are two that are fundamental. First is the problem that a dynamic environment, even the modest vibration dynamics that occurs in a research laboratory, can cause unwanted excitations of the transverse modes. This will cause a reduction in contrast that becomes worse the longer the measurement time. The second is the deleterious effects of atom interactions. At best they cause phase-diffusion which also becomes worse as the interrogation time becomes longer, and at worst they cause heating and loss of atoms. J. A. Stickney, D. Z. Anderson, and A. A. Zozulya, "Increasing the coherence time of Bose-Einstein-condensate interferometers with optical control of dynamics," Phys Rev A, vol. 75, no. 6, June 2007. Unfortunately, these two issues are at odds: one can reduce the atom interactions by utilizing loose traps, but then the transverse excitations become exacerbated. There are other challenges facing trapped atom approaches to rotation sensing: magnetic trapping is prone to adding noise due to both technical (current noise in the power supplies) and fundamental (Johnson noise) sources.

Optical trapping also has its challenges, e.g. in a circular optical waveguide the intensity non-uniformities can cause heating of the atoms. The challenges of the weak-trapping approaches may indeed be overcome, but to date they have not provided high performance in even a modest dynamics environment. The shaken-lattice approach, by contrast, uses high trapping forces to minimize transverse mode excitations. Atom interactions are minimized in some embodiments by working at low atomic densities such that any given site has low probability of occupation. Importantly, the system can operate in dynamical environments as long as the corresponding forces are small compared with those holding the atoms.

In an embodiment, atom interference is observed, and the Allan deviation and phase repeatability is measured. Atom interference is at 10% contrast with trap and laser power less than 10 Watts (W) and a Sagnac area of better than 10 mm$^2$. The instrument has a phase repeatability of 100 mrads over 2/24/2 hr on/off/on and an Allan deviation better than 100 mrad*s$^{1/2}$ for 1 to 3600 seconds. The instrument can be subjected to a 10° tip over and yet continue operation with negligible change in performance.

In another embodiment, gyroscopic operation is observed and the Allan deviation and scale factor stability are measured. In addition, the invariance to acceleration, temperature stability and mechanical vibration tolerance of the atomic lattice gyro (ALG) are measured. The ALG is demonstrated with 80% atom interference contrast and a Sagnac area of at least 100 mm$^2$ with the volume of the sum of components less than 0.5 L and consuming less than 10 W power. In addition, the instrument exceeds an Allan deviation of 30 mrad*s$^{1/2}$ for 1 to 3600 seconds and phase repeatability of 10 mrads over 2/24/2 hr on/off/on. Environmental apparatus are applied to the second ALG instrument to demonstrate phase stability to 1 mrad under +/−1 g acceleration with turn over tests at 0°, 90°, and 190°, 10 ppb/C temperature stability of the interferometer area, and stable ALG operation (gyroscopic measurement) under mechanical vibration of 0.01 g2/Hz from 10 Hz to 1000 Hz.

Herein, all art labeled "prior art", if any, is admitted prior art; all art not labelled "prior art" is not admitted prior art. The illustrated embodiments as well as modifications thereto and variation thereon are provided for by the present invention, the scope of which is defined by the following claims.

What is claimed is:

1. A shaken-lattice matter-wave gyroscope process comprising:
    trapping unified matter-waves associated with matter particles in a lattice set of one or more optical lattices, the lattice set including nodes and antinodes;
    time-varying the positions of the nodes and antinodes so as to:
        split the unified matter-waves to yield split matter-waves,
        counter-propagate the split matter-waves around a closed path, and
        recombine the split matter-waves so as to produce an interference pattern; and
    evaluating angular velocity or a parameter related to angular velocity based on the interference pattern.

2. The shaken-lattice matter-wave gyroscope process of claim 1 further comprising using machine learning to determine a shaking-function set of one or more shaking functions, the time-varying of the positions of the nodes and antinodes resulting from implementation of the shaking-function set.

3. The shaken-lattice gyroscope matter-wave process of claim 1 wherein a trapping force of the lattice set is at least 30 g.

4. The shaken-lattice matter-wave gyroscope process of claim 3 wherein the lattice set is sparsely populated by the matter particles in that at most 30% of available sites in the lattice set are occupied by the matter particles during the counter-propagating.

5. The shaken-lattice matter-wave gyroscope process of claim 1 further comprising forming a Bose-Einstein condensate (BEC) including the matter particles.

6. The shaken-lattice matter-wave gyroscope process of claim 5 wherein the trapping includes transporting the matter particles from the BEC to the first and second optical lattices.

7. The shaken-lattice matter-wave gyroscope process of claim 1 wherein the matter particles include rubidium atoms.

8. The shaken-lattice matter-wave gyroscope process of claim 7 wherein the first and second optical lattices are formed using 852 nanometer (nm) laser light locked using cesium.

9. The shaken-lattice gyroscope matter-wave process of claim 1 wherein the split matter-waves are counter-propagated around the closed path plural times prior to recombination.

10. The shaken-lattice matter-wave gyroscope process of claim 1 wherein the closed path encloses an area between one square millimeter and one square centimeter.

11. A shaken-lattice matter-wave gyroscope system comprising:
    a lattice generator for using light to generate a lattice set of one or more multi-dimensional optical lattices for trapping unified matter-waves associated with matter particles, each matter particle having a respective wave function;
    a modulator for time-varying the positions of the nodes and antinodes so as to:
        split the unified matter-waves to yield split matter-waves,
        counter-propagate the split matter-waves around a closed path, and
        recombine the matter-waves so as to produce an interference pattern; and
    a measurement system for evaluating angular velocity or a value related to angular velocity based at least in part on an interference pattern created once the matter particles are recombined.

12. The shaken-lattice matter-wave gyroscope system of claim 11 further comprising a machine-learning engine for determining a shaking function set of one or more shaking functions, the time-varying the positions of the nodes and antinodes including implementing the shaking-function set.

13. The shaken-lattice matter-wave gyroscope system of claim 11 wherein a trapping force of the lattice set is at least 30 g.

14. The shaken-lattice matter-wave gyroscope system of claim 13 wherein the lattice set is sparsely populated by the matter particles in that at most 30% of available sites in the lattice set are occupied by the matter particles during the counter-propagating.

15. The shaken-lattice matter-wave gyroscope system of claim 11 further comprising a cooling system for generating a Bose-Einstein condensate (BEC) including the matter particles.

16. The shaken-lattice matter-wave gyroscope system of claim 15 wherein the trapping includes transporting the matter particles from the BEC to the lattice set.

17. The shaken-lattice matter-wave gyroscope system of claim 11 wherein the matter particles include rubidium atoms.

18. The shaken-lattice matter-wave gyroscope system of claim 17 wherein the lattice set is formed using 852 nanometer (nm) laser light locked using cesium.

19. The shaken-lattice matter-wave gyroscope system of claim 11 wherein the split matter waves are counter-propagated around the closed path plural times prior to recombination.

20. The shaken-lattice matter-wave gyroscope system of claim 11 wherein the closed path encloses an area between one square millimeter and one square centimeter.

* * * * *